United States Patent [19]
Rosenberg

[11] 4,412,694
[45] Nov. 1, 1983

[54] CLAMPING DEVICES PARTICULARLY USEFUL AS PIPE COUPLINGS

[76] Inventor: Avner Rosenberg, Moshav Beit Shearim, Israel

[21] Appl. No.: 190,721

[22] Filed: Sep. 25, 1980

[51] Int. Cl.³ ............................................. F16L 37/18
[52] U.S. Cl. .................................... 285/178; 285/314
[58] Field of Search .............................. 285/314, 178; 403/DIG. 8, 352, 351, 328, DIG. 7

[56] References Cited

U.S. PATENT DOCUMENTS

| | | | |
|---|---|---|---|
| 592,899 | 11/1897 | Wilson | 285/314 |
| 1,740,574 | 12/1929 | Christensen | 285/314 X |
| 1,788,366 | 1/1931 | Anderson | 285/178 X |
| 2,001,244 | 5/1935 | Ezell | 285/314 X |
| 2,463,179 | 3/1949 | Iftiger, Sr. | 285/314 X |
| 2,478,052 | 8/1949 | Palm | 285/314 |
| 3,444,753 | 5/1969 | Runkle | 403/351 X |
| 3,482,889 | 12/1969 | Cochran | 403/352 X |

FOREIGN PATENT DOCUMENTS 1007203  10/1965  United Kingdom .............. 285/314

*Primary Examiner*—Thomas F. Callaghan
*Attorney, Agent, or Firm*—Benjamin J. Barish

[57] ABSTRACT

Clamping devices particularly useful as pipe couplings comprise a pair of clamping segments interposed between the housing end face and an apertured cap rotationally mounted on the housing, the cap including cam surfaces effective, upon rotation of the cap, to displace the clamping segments radially inwardly to grip the pipe, or radially outwardly to release the pipe. In one embodiment, the clamping segments are of a circle having a radius of curvature larger than the pipe to be clamped. In other embodiments, the clamping segments are formed with inclined walls to define triangular spaces at their adjacent ends, which triangular spaces receive rollable elements adapted to be displaced inwardly, when the clamping segments are displaced outwardly to their released positions, to engage the pipe and thereby to assure its release from the clamping segments.

11 Claims, 9 Drawing Figures

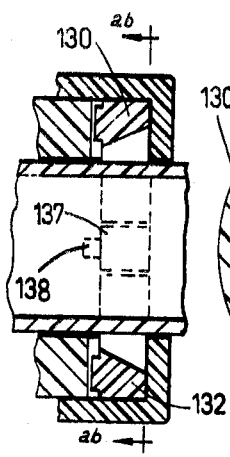 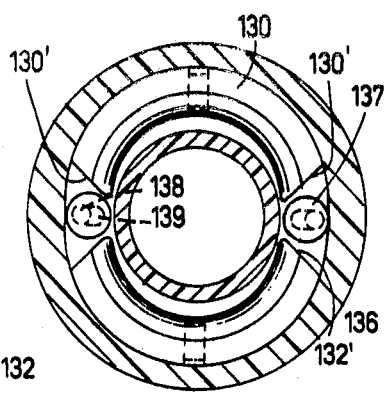 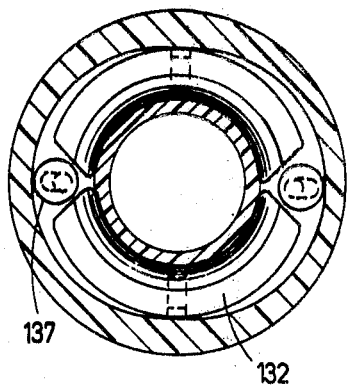
FIG. 2  FIG. 2a  FIG. 2b
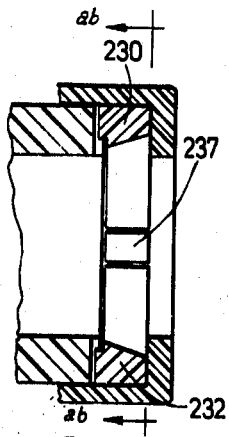 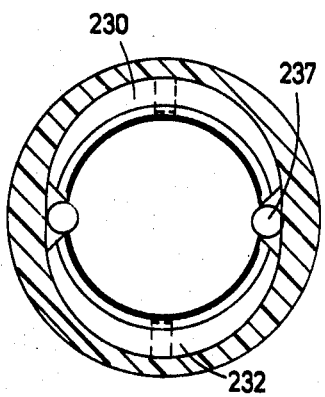 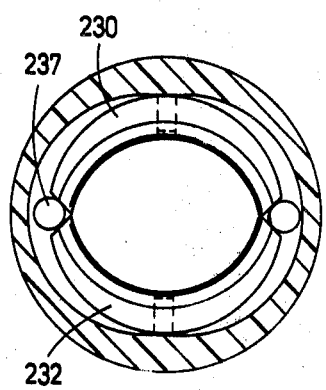
FIG. 3  FIG. 3a  FIG. 3b

4,412,694

CLAMPING DEVICES PARTICULARLY USEFUL AS PIPE COUPLINGS

BACKGROUND OF THE INVENTION

The present invention relates to clamping devices of a type for use with tubular or rod-shaped members. The invention is particularly useful as a pipe coupling, and is therefore described below with respect to this application, but it will be appreciated that the invention could advantageously be used in other applications as well.

Many diverse types of pipe couplings have been developed and are available on the market, but, nevertheless, efforts are continuously being made for devising new types of pipe couplings which are quickly attachable to and detachable from the pipe, which provide a positive engagement and release, and which can be manufactured inexpensively with few and simple parts.

An object of the present invention is to provide a clamping device particularly useful as a pipe coupling and having advantages in the above respects.

BRIEF SUMMARY OF THE INVENTION

According to a broad aspect of the invention, there is provided a clamping device particularly useful as a pipe coupling, comprising a housing having a bore through an end face for receiving the pipe to be coupled, and a cap rotationally mounted over the housing end face. The cap includes a skirt enclosing the housing, and an end wall having an aperture therethrough for the pipe to be coupled. The clamping device further includes a plurality of interposed elements comprising a pair of clamping segments interposed between the housing end face and the inner face of the cap end walls on opposite sides of its aperture. Each of the clamping segments includes a concavely-curved inner edge, preferably sharpened, engageable with the outer face of the pipe to be coupled. In addition, the cap includes displacing means effective upon rotation of the cap to one position to displace the clamping segments along a rectilinear path radially inwardly to grip the pipe when inserted into the housing, or upon rotation to a second position to displace the clamping segments radially outwardly to release the pipe.

In the preferred embodiments of the invention described below, the displacing means on the cap comprises cam surfaces formed on the inner face of the cap and engageable with the outer faces of the clamping elements. More particularly, in these described embodiments the outer faces of the clamping segments are convexly-curved, and the cap cam surfaces are defined by the inner diameter of the cap skirt which is larger along a first axis than along a second axis at right angles thereto. The clamping segments include keying projections receivable within radial slots formed in the end face of the housing for permitting radial movement, but blocking rotational movement, of the clamping segments when displaced to their clamping or released positions.

Three embodiments of the invention are described below for purposes of example. In one described embodiment, the clamping segments are of a circle having a radius of curvature larger than the pipe to be clamped. In a second described embodiment, the clamping segments are of a circle having a radius of curvature substantially equal to the pipe to be clamped, but include rollable elements in triangular spaces formed at the adjacent ends of the two clamping segments to assure positive release of the clamping segments from the pipe when the clamping segments are displaced to their released positions. A third described embodiment also uses the releasing rollable elements at the ends of the clamping segments but the clamping segments are of a circle having a radius of curvature larger than the pipe to be clamped.

Further features and advantages of the invention will be apparent from the description below.

BRIEF DESCRIPTION OF THE DRAWINGS

The invention is herein described, by way of example only, with reference to the accompanying drawings, wherein:

FIG. 2 is a fragmentary view and FIGS. 2a and 2b are transverse sectional views, corresponding to the views of FIGS. 1, 1a and 1b, of a second form of pipe coupling constructed in accordance with the invention; and FIGS. 3, 3a and 3b are corresponding views of a third form of pipe coupling constructed in accordance with the invention.

DESCRIPTION OF THE PREFERRED EMBODIMENTS

Figure 1:
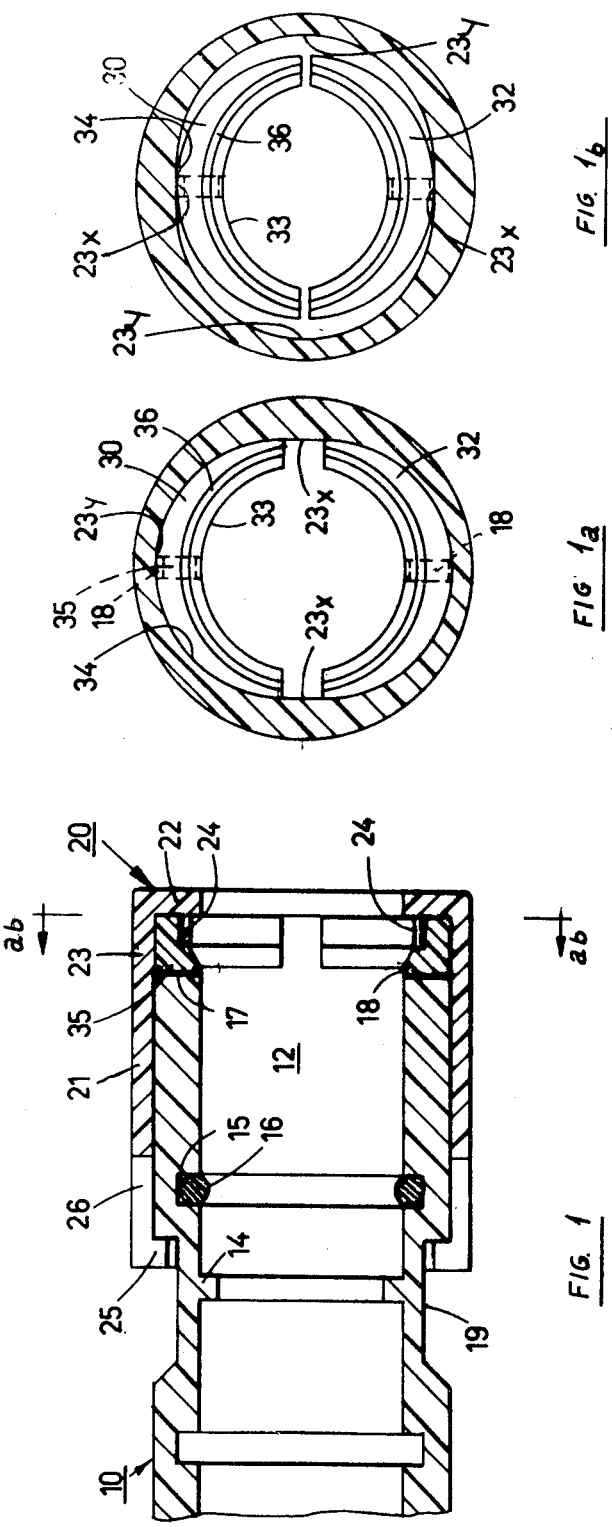
FIG. 1 is a longitudinal sectional view illustrating one form of pipe coupling constructed in accordance with the invention, FIGS. 1a and 1b being transverse sectional views illustrating the released and clamping conditions, respectively, of the coupling of FIG. 1.

Embodiment of FIGS. 1, 1a and 1b

The pipe coupling illustrated in FIGS. 1, 1a and 1b includes a housing, generally designated 10, and a cap, generally designated 20, rotationally mounted over one end of the housing. Housing 10 is formed with a cylindrical bore 12 for receiving the pipe to be coupled, and an internal annular rib 14 defining a shoulder engageable with the end of the pipe for limiting its position within the housing. The housing is further formed with an internal annular recess 15 for receiving a sealing ring 16 between shoulder 14 and the end face 17 of the housing. The latter end face 17 is flat, except that it is formed with two slots 18 at diametrically opposed locations and elongated in the radial direction, for purposes to be described below. Finally, the outer face of housing 10 is formed with an annular recess 19 for rotatably mounting the end cap 20.

End cap 20 is formed with a skirt 21 enclosing the housing, and with an end wall 22 having a central aperture through which the pipe (not shown) is passed into bore 12 of the housing 10. The juncture portion 23 of cap 20, joining skirt 21 with its end wall 22, is formed with internal cam surfaces, for purposes to be described below. These cam surfaces are constituted by the inner diameter of portion 23 of the cap skirt being larger along one axis than along the other axis at right angles thereto. This is particularly shown in FIGS. 1a and 1b, wherein it will be seen that the inner diameter of skirt portion 23 of the cap is larger along the Y-axis than along the X-axis, thereby defining a cam surface having diametrically opposed radially-extending high points 23x and low points 23y. In addition, end wall 22 is formed with a pair of axially-extending pins or projections 24 at opposite sides of its central aperture, for a purpose to be described more particularly below.

The end of cap 20 opposite to its end wall 22 is formed with an inwardly-directed annular flange 25 seated within annular recess 19 of the housing, thereby permitting rotational, but not axial, movement of the cap with respect to the housing. This end of cap 20 may be formed with axial slits 26, so as to facilitate the application of the cap flange 25 within the housing recess 19.

The coupling illustrated in FIGS. 1, 1a and 1b further includes a plurality of interposer elements, constituted by two clamping segments 30, 32, interposed between the end face 17 of the housing 10 and the inner face of the cap end wall 22 on opposite sides of its pipe-receiving aperture 23. Each of the clamping segments 30, 32 is provided with a sharpened concavely-curved inner edge 33, and a convexly-curved outer edge 34. Further, each is formed with an axial projection 35 on its inner face adapted to be received within the radially-extending slots 18 in the outer face of the housing 10.

Each of the clamping segments 30, 32 is of a partial-circular configuration but has a radius of curvature larger than the pipe (not shown) to be clamped. The outer edges of these clamping segments engage the inner cam surfaces 23x, 23y of the cap causing the segments to be moved radially inwardly by the rotation of cap 20 one-half revolution to effect the clamping of the pipe received within the housing. In addition, the axially-extending pins 24 in the cap are each received within a circular recess 36 formed in the respective clamping segment adjacent to, and of the same radius of curvature as, its inner sharp edge 33 such that rotation of the cap 20 another one-half revolution causes the pins 24 to move the clamping segments outwardly to thereby release the pipe.

The pipe coupling illustrated in FIGS. 1, 1a and 1b is used in the following manner:

First, to assemble the coupling, the two clamping segments 30, 32 are held against the end face 17 of the housing 10, with the projections 35 of the segments received within slots 18 of the housing. The end cap 20 is then applied with its slitted, flanged end 24 received within annular recess 19 of the housing 10, with the inner face of end wall 22 pressed against the outer face of the clamping segments, and with the pins 24 of the end wall received within the circular recesses 36 of the clamping segments.

Cap 20 is then rotated to bring the diametrically-opposed low points 23y of the inner cap surface 23 into alignment with the mid-portions of the clamping segments 30, 32, as illustrated in FIG. 1a. During the rotation of the cap, the pins 24 received within the recesses 36 of the clamping segments, move the clamping segments radially outwardly so that they are in their released positions. Therefore a pipe (not shown) to be clamped may be passed through the central aperture of cap 20 into bore 12 of the housing to limit against the internal shoulder 14 of the housing.

Now, in order to clamp the pipe within the housing, it is only necessary to rotate cap 20 one-half revolution until its diametrically-opposed high points 23x come into alignment with the mid-portions of the clamping segments 30, 32, as shown in FIG. 1b. This forces the clamping segments along rectilinear paths radially inwardly so that their inner sharpened edges 33 bite into the pipe, thereby securely gripping the pipe within the housing. In order to release the pipe for removal, cap 20 is rotated another one-half revolution to again bring the low points 23y into alignment with the mid-portions of the clamping segments 30, 32, while the pins move the clamping segments outwardly, as shown in FIG. 1a.

It will be appreciated that the movements of the clamping segments 30 and 32 into their clamping and released positions are guided by their projections 35 moving within the radial slots 18 formed in the end face of the housing 10.

Since, in the embodiment of FIGS. 1, 1a and 1b, the radius of curvature of the clamping segments 30, 32 is greater than that of the pipe being clamped, the gripping of the pipe, when clamped, will be effected by the mid-portions of the clamping segments 30, 32. Accordingly, there is little or no danger that the ends of the clamping segments will become embedded in the pipe, which might hinder the release of the pipe when the clamping segments are moved to their released positions.

EMBODIMENT OF FIGS. 2, 2a AND 2b

FIGS. 2, 2a and 2b illustrate a second embodiment of the invention wherein the clamping elements, therein designated 130, 132, have a radius of curvature substantially equal to the pipe P being clamped. In such a case, there is a danger that when the clamping segments are moved to their released positions, the ends of the clamping segments will not release from the pipe and will remain embedded in the pipe.

To minimize this possibility, the coupling illustrated in FIGS. 2, 2a and 2b is formed with inclined end walls, shown as 130', 132', to define, between adjacent ends, a triangular space 136 bounded by the adjacent inclined end walls of the two clamping segments. Disposed within each of these two triangular spaces 136 is a rollable element 137 having a circular surface engaging the inclined end walls 130', 132' such that when the clamping segments are displaced outwardly from their clamping position (FIG. 2b) to their released position (FIG. 2a), the roller elements move inwardly to press against the pipe and thereby to better assure its release from the ends of the clamping segments. These rollable elements 137 are preferably of cylindrical configuration, but may also be of spherical configuration. In addition, they may also include central projections 138 in their inner end faces movable within radial slots 139 formed in the confronting end faces of the housing to constrain their movements to the radial direction. In all other respects, the pipe coupling illustrated in FIGS. 2, 2a and 2b is of the same construction, and operates in the same manner, as described above with respect to that of FIGS. 1, 1a and 1b.

EMBODIMENT OF FIGS. 3, 3a AND 3b

FIGS. 3, 3a and 3b illustrate a pipe coupling similar to that of FIGS. 2, 2a and 2b, except that the clamping segments, therein designated 230, 232, have a radius of curvature substantially larger than that of the pipe to be clamped, as is evident from FIG. 3b illustrating the clamping segments in their clamping positions. The coupling of FIGS. 3, 3a and 3b also includes the releasing rollable elements, therein designated 237, corresponding to elements 137 in FIGS. 2, 2a and 2b, for assuring release of the ends of the clamping segments from the pipes when the coupling is in its released condition (FIG. 3a). However, by using in FIGS. 3, 3a and 3b clamping segments of larger radius of curvature than the pipe to be clamped, smaller size roller elements 237 than in FIGS. 2, 2a and 2b are needed to assure this release of the pipe. Accordingly, the central projections (138) movable in radial slots (139) may be omitted.

While the invention has been described with respect to three preferred embodiments, it will be appreciated that many other variations, modifications, and applications of the invention may be made.

What is claimed is:

1. A clamping device particularly useful as a pipe coupling, comprising a housing having a bore through one end face for receiving the pipe to be coupled, and a cap rotationally mounted over the housing end face and including a skirt enclosing the housing, and an end wall having an aperture therethrough for the pipe to be coupled; characterized in that said device further includes a plurality of interposer elements comprising a pair of clamping segments interposed between said end face of the housing and the inner face of the cap end wall on opposite sides of the aperture; each of said clamping segments having a convexly-curved outer face, and a concavely-curved inner edge engageable with the outer face of the pipe to be coupled, said cap including displacing means effective upon rotation of the cap to one position, to displace said clamping segments along a rectilinear path radially inwardly to grip the pipe when inserted into the housing, and upon rotation to a second position, to displace said clamping segments radially outwardly to release the pipe; said displacing means comprising cam surfaces, constituted by radially-extending high points and low points formed on the inner face of said skirt, engageable with the outer convex faces of said clamping segments effective to displace said segments radially inwardly upon the rotation of said cap; the inner edges of said clamping segments engaging substantially the complete circumference of the pipe, and being sharpened for biting into the pipe, when the pipe is received within the housing and the clamping segments are actuated to their clamping positions.

2. A device according to claim 1, wherein the outer faces of said clamping segments are convexly-curved, said cam surfaces being constituted by the inner diameter of the cap skirt being larger along a first axis than along a second axis at right angles thereto to define said radially-extending high points and low points formed on the inner face of said cap skirt.

3. A device according to claim 1, further including keying means between the confronting inner face of at least one of the interposer elements and the end face of the housing permitting radial movement, but blocking rotational movement, of the clamping segments with respect to the housing.

4. A device according to claim 3, wherein said keying means comprises a plurality of axially-extending projections formed on one of said confronting faces receivable in radially-elongated slots formed in the other of said confronting faces.

5. A device according to claim 4, wherein said axially-extending projections are formed on said clamping segments and are receivable in radially-extending slots formed in the end face of said housing.

6. A device according to claim 1, wherein said displacing means further includes axially-extending pins fixed to said cap and receive within curved recesses formed in said end segments effective to displace said segments radially outwardly upon the rotation of said cap.

7. A device according to claim 1, wherein said clamping segments are each of circular configuration but have a radius of curvature larger than the pipe to be clamped.

8. A clamping device particularly useful as a pipe coupling, comprising: a housing having a bore through one end face for receiving the pipe to be coupled; a cap rotationally mounted over the housing end face and including a skirt enclosing the housing, and an end wall having an aperture therethrough for the pipe to be coupled; a plurality of interposer elements including a pair of clamping segments interposed between said end face of the housing and the inner face of the cap end wall on opposite sides of the aperture, each of said clamping segments having a concavely-curved inner edge engageable with the outer face of the pipe to be coupled; and displacing means effective upon rotation of the cap to one position, to displace said clamping segments radially inwardly to grip the pipe when inserted into the housing, and upon rotation to a second position, to displace said clamping segments radially outwardly to release the pipe; said clamping segments being formed with inclined end walls at their opposite ends to define, between adjacent ends, a triangular space bounded by the two inclined end walls of the segments, said interposer elements further including a rollable element received in each of said triangular spaces and having a circular surface engaging said inclined end walls such that when the clamping segments are displaced outwardly to their released positions, said roller elements move inwardly to engage the pipe and thereby to assure its release from the ends of the clamping segments.

9. A device according to claim 8, wherein said clamping segments are segments of a circle having a radius of curvature substantially equal to that of the pipe to be clamped.

10. A device according to claim 8, wherein said roller elements are in the form of round discs and include pins projecting axially within slots formed in the end face of the housing and extending radially thereof.

11. A device according to claim 8, wherein said clamping segments are segments of a circle having a radius of curvature larger than the pipe to be clamped.

* * * * *